United States Patent
Katsuta et al.

(12) 
(10) Patent No.: US 6,615,637 B2
(45) Date of Patent: Sep. 9, 2003

(54) METHOD OF ZERO ADJUSTMENT OF A LOAD CELL FOR DETECTING BACK PRESSURE OF A SCREW IN AN ELECTRIC INJECTION MOLDING MACHINE

(75) Inventors: Hiroshi Katsuta, Gotemba (JP); Makoto Nishizawa, Numazu (JP)

(73) Assignee: Toshiba Machine Co., Ltd., Tokyo (JP)

( * ) Notice: Subject to any disclaimer, the term of this patent is extended or adjusted under 35 U.S.C. 154(b) by 0 days.

(21) Appl. No.: 10/082,049

(22) Filed: Feb. 26, 2002

(65) Prior Publication Data

US 2002/0116981 A1 Aug. 29, 2002

(30) Foreign Application Priority Data

Feb. 28, 2001 (JP) ........................................ 2001-055041

(51) Int. Cl.[7] ............................................... B29C 45/77
(52) U.S. Cl. ......................................... 73/1.15; 702/87
(58) Field of Search ........................... 73/1.15; 702/87; 264/40.1, 40.5, 328.1; 425/149

(56) References Cited

U.S. PATENT DOCUMENTS 5,567,367 A * 10/1996 Ito et al. ................... 264/40.1
5,997,780 A * 12/1999 Ito et al. ................... 264/40.5
6,244,848 B1 * 6/2001 Ito ............................. 425/149

FOREIGN PATENT DOCUMENTS

| JP | 09117946 A | 5/1997 |
| JP | 2000006217 A | 11/2000 |

* cited by examiner

Primary Examiner—Hezron Williams
Assistant Examiner—Nashmiya Fayyaz
(74) Attorney, Agent, or Firm—Pillsbury Winthrop LLP

(57) ABSTRACT

A screw is incorporated into a heating barrel. A ball screw is connected to a rear end portion of the screw through a load cell, and a servomotor for injection is connected to the ball screw. First, the heating barrel is retreated and separated from a mold, and the screw is moved to the half stroke position. After the screw is advanced for a preset period of time, the servomotor is stopped by automatic decompression to detect an output of the load cell. Similarly, after the screw is retreated for a preset period of time, the servomotor is stopped by automatic decompression to detect an output of the load cell. An average of outputs of the load cell after the screw advances and retreats is calculated and considered to be an output of the load cell under no-load conditions, thereby performing zero adjustment of the load cell.

4 Claims, 2 Drawing Sheets

METHOD OF ZERO ADJUSTMENT OF A LOAD CELL FOR DETECTING BACK PRESSURE OF A SCREW IN AN ELECTRIC INJECTION MOLDING MACHINE

CROSS-REFERENCE TO RELATED APPLICATIONS

This application is based upon and claims the benefit of priority from the prior Japanese Patent Application No. 2001-055041, filed Feb. 28, 2001, the entire contents of which are incorporated herein by reference.

BACKGROUND OF THE INVENTION

1. Field of the Invention

The present invention relates to a method of zero adjustment of a load cell for detecting back pressure of a screw in an injection-unit of an electric injection molding machine.

2. Description of the Related Art

In an electric injection molding machine, a given amount of molten resin is stored in a heating barrel of an injection unit and then a screw is moved forward in the heating barrel to inject the molten resin into a mold. When the molten resin is stored in the heating barrel and when it is injected into the mold, the pressure of the molten resin in the heating barrel is detected using a load cell mounted on a rear end portion of the screw. This pressure is called back pressure of the screw.

Since zero point of a load cell is easy to vary with time, it needs to be adjusted appropriately in order to exactly control the back pressure of the screw. Usually, the zero adjustment of the load cell is carried out periodically. Beside this, if an output of the load cell exceeds a given allowance when the heating barrel is empty and evidently the screw is under no-load conditions, e.g., when the injection molding machine starts to operate, it is determined that the zero point of the load cell is shifted and its adjustment is carried out at any time.

Jpn. Pat. Appln. KOKAI Publication No. 2000-6217 discloses the method of zero adjustment of a load cell as follows. A plurality of advance and retreat operations of a screw are carried out. An average value of outputs of the load cell is calculated for each of the advance and retreat operations and an average of the average values of outputs of the load cell for the plurality of advance and retreat operations is taken, thereby performing zero adjustment of the load cell.

Jpn. Pat. Appln. KOKAI Publication No. 9-117946 discloses the method of zero adjustment of a load cell as follows. After a screw is moved to the half stroke position between the limit of advance and that of retreat, a servomotor is damped and oscillated to stop the screw in the half stroke position. Thus, a ball screw that drives the screw causes a backlash having equal play in both advance and retreat directions and a load acting on the load cell is removed, thereby performing zero adjustment of the load cell.

The foregoing prior art methods of zero adjustment of a load cell had problems of requiring a complicated procedure and a lot of time to perform an adjustment operation.

BRIEF SUMMARY OF THE INVENTION

The present invention has been developed in consideration of the above problems of a prior art method of zero adjustment of a load cell for detecting back pressure of a screw in an electric injection molding machine. An object of the present invention is to provide a method capable of performing zero adjustment of a load cell in a short time by a simple procedure.

According to the present invention, there is provided a method of zero adjustment of a load cell for detecting back pressure of a screw in an electric injection molding machine, the electric injection molding machine comprising:

a heating barrel;

a screw incorporated in the heating barrel and driven by a servomotor in an axial direction, which injects molten resin into a mold; and a load cell connected to a rear end portion of the screw, which detects back pressure of the screw, wherein the method comprises the steps of:

driving the servomotor for a preset period of time in a first direction in a half stroke position of the screw, then stopping the servomotor by automatic decompression, and detecting and recording an output of the load cell as a first output driving the servomotor for a preset period of time in a second direction opposite to the first direction, then stopping the servomotor by automatic decompression, and detecting and recording an output of the load cell as a second output; and calculating an average of the first output and the second output and performing zero adjustment of the load cell using the average while considering the average to be an output of the load cell under no-load conditions.

In the above-described zero adjustment method, the "automatic decompression" means that the servomotor is stopped by gradually reducing a current supplied to the servomotor. The automatic decompression is performed, for example, by reducing a current linearly or exponentially.

Since the servomotor is stopped by automatic decompression as described above, the influence of the friction in the ball screw for driving the screw and the resin resistance in the heating barrel can be reduced as much as possible. If, therefore, the outputs of the load cell are detected after the servomotor advances and retreats under the above conditions and then an average of the outputs is calculated, an output of the load cell under no-load conditions is exactly obtained, and zero of the load cell can be adjusted using the average.

Preferably, the heating barrel is retreated and separated from the mold prior to the step of driving the servomotor for a preset period of time in the first direction.

Preferably, when the average of the first output and the second output exceeds a given tolerance, it is determined that the load cell malfunctions, and a control system issues an alarm.

Preferably, date and time when the zero adjustment of the load cell is performed and the average of the first output and the second output are stored in a storage unit as actual-result data, and a given number of past actual-result data is displayed on a display panel of a control system.

DETAILED DESCRIPTION OF THE INVENTION

Figure 1:
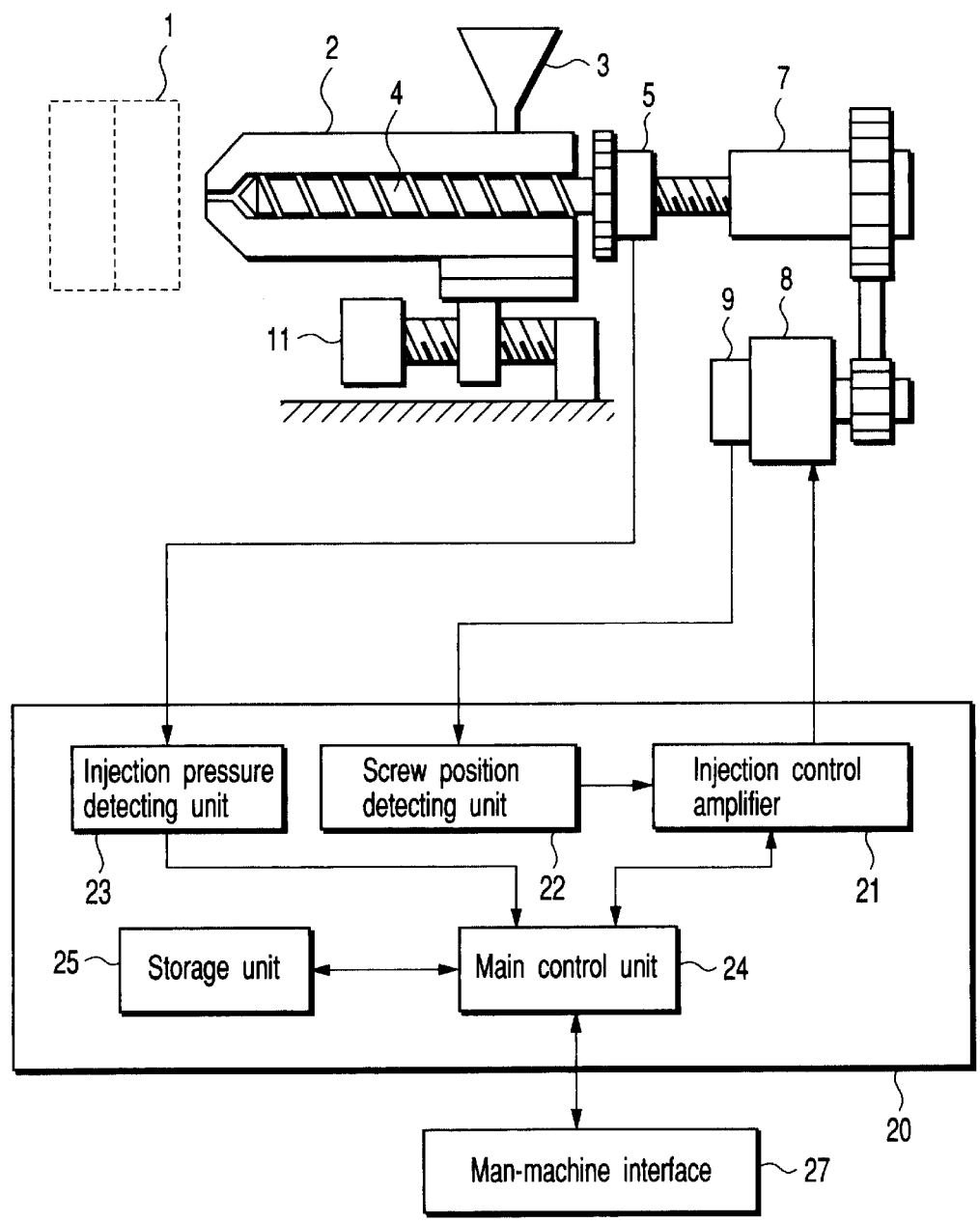
FIG. 1 is a schematic view showing a structure of an injection unit of an electric injection molding machine to which a method of zero adjustment of a load cell for detecting back pressure of a screw according to the present invention is applied.

FIG. 1 schematically shows a structure of an injection unit of an electric injection molding machine to which a method of zero adjustment of a load cell for detecting back pressure of a screw according to the present invention is applied. For brevity, the components that are not directly related to the zero adjustment of a load cell are omitted from FIG. 1. In FIG. 1, reference numeral 1 denotes a mold; 2 a heating barrel; 4 a screw; 5 a load cell; 8 a servomotor for injection; and 11 a driving motor of the heating barrel.

The heating barrel 2 is driven back and forth (in right and left directions in FIG. 1) by the motor 11. For injection molding, the heating barrel 2 is advanced and a nozzle at the front end of the heating barrel 2 is mounted on a gate provided on the back of the mold 1. For zero adjustment of the load cell 5, the heating barrel 2 is retreated and its front end is separated from the back of the mold 1.

The screw 4 is incorporated into the heating barrel 2. A hopper 3 is connected to the portion close to the rear end of the heating barrel 2. In a charging step, the screw 4 is rotated in the forward direction in the heating barrel 2 using a servomotor for charging (not shown) to introduce resin into the heating barrel 2 from the hopper 3. The introduced resin is melted by heating and agitation and sent ahead of the screw 4. Accordingly, the pressure of resin increases at the front portion of the heating barrel 2 and thus the screw 4 gradually retreats. The molten resin is therefore stored at the front portion of the heating barrel 2.

A ball screw 7 is connected to the rear end portion of the screw 4 through the load cell 5. The servomotor 8 for injection is connected to the ball screw 7. A screw position detector 9 is connected to the servomotor 8. The screw position detector 9 detects a position of the screw 4 from the number of revolutions of the servomotor 8. The load cell 5 detects the pressure of molten resin (back pressure of the screw) stored at the front portion of the heating barrel 2 from the reaction force exerted on the rear end portion of the screw 4. After a predetermined amount of molten resin is stored in the heating barrel 2, the servomotor 8 is driven to move the screw 4 forward. Thus, the molten resin is injected into the mold 1.

A control system 20 comprises an injection control amplifier 21, a screw position detecting unit 22, an injection pressure detecting unit 23, a main control unit 24, a storage unit 25, and a man-machine interface 27. The injection pressure detecting unit 23 supplies the main control unit 24 with back pressure data transmitted from the load cell 5. The screw position detecting unit 22 supplies the injection control amplifier 21 with screw position data transmitted from the screw position detector 9. The injection control amplifier 21 amplifies the screw position data and sends the amplified data to the main control unit 24.

An operator of the injection molding machine gives an instruction to start zero adjustment of the load cell 5 to the control system 20 from the man-machine interface 27. The main control unit 24 sends a command to the servomotor 8 through the injection control amplifier 21 in accordance with preset conditions to control advance and retreat operations of the screw 4. The storage unit 25 receives the actual-result data of zero adjustment of the load cell 5 from the main control unit 24 and stores it. The main control unit 24 reads the actual-result data of the past zero adjustment from the storage unit 25 and displays it on a display panel of the man-machine interface 27.

The procedure of zero adjustment of the load cell 5 in the foregoing injection unit will now be described. If an output of the load cell 5 exceeds a given allowance when the screw 4 is evidently under no-load conditions, e.g., when the injection molding machine starts to operate, it is determined that zero point of the load cell 5 is shifted and zero adjustment of the load cell 5 is carried out.

When the operator gives an instruction to start zero adjustment from the man-machine interface 27, the control system 20 first retreats the heating barrel 2 to the limit of retreat and separates it from the back of the mold 1. Then, the control system 20 moves the screw 4 to the half stroke position between the limit of advance and that of retreat.

After that, the servomotor 8 is driven for a preset period of time to advance the screw 4 and stop it before it reaches the limit of advance. At this time, a current for holding the screw 4 in a given position flows through the servomotor 8. Then, the servomotor 8 is stopped by automatic decompression such that the current becomes zero. After the servomotor 8 is stopped, an output of the load cell 5 is detected and stored in the storage unit 25. The "automatic decompression" means that the servomotor 8 is stopped while its rotation speed is gradually decreasing by gradually reducing the current supplied to the servomotor 8.

Then, the servomotor 8 is driven for a preset period of time to retreat the screw 4 and stop it before it reaches the limit of retreat. At this time, the servomotor 8 is stopped by automatic decompression as described above. After the servomotor 8 is stopped, an output of the load cell 5 is detected and stored in the storage unit 25.

An average of the output of the load cell 5, which is detected and stored after the screw 4 advances and stops, and that of the load cell 5, which is detected and stored after the screw 4 retreats and stops, is calculated. This average is considered to be an output of the load cell 5 when the load cell 5 is under no-load conditions and zero adjustment of the load cell 5 is performed such that the average becomes zero. Thus, an error of the output of the load cell 5 is eliminated. The above average before the zero adjustment (referred to as "zero shift output" hereinafter) is stored in the storage unit 25 as actual-result data.

If the value of zero shift output obtained as described above falls outside a given tolerance, it is determined that the load cell malfunctions and the control system 20 issues an alarm.

Figure 2:
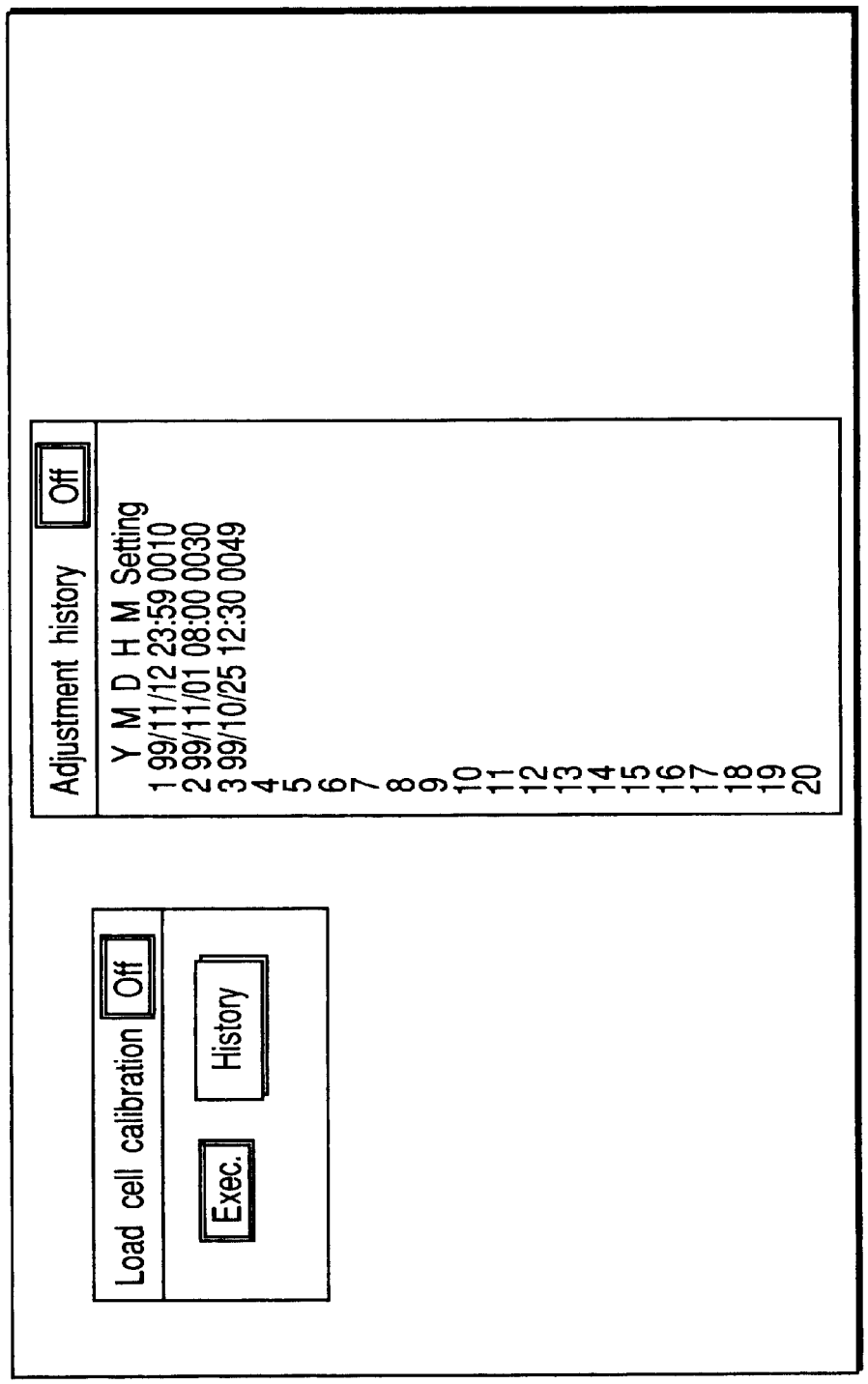
FIG. 2 is a view showing an example of a screen for displaying a history of zero adjustment of the load cell.

Whenever zero adjustment of the load cell 5 is carried out, its data is stored in the storage unit 25 and its date and time and a value of the zero shift output are displayed on the man-machine interface 27 as a history of the past zero adjustment. FIG. 2 shows an example of a display screen showing a history of zero adjustment of the load cell. When an interval between dates or times for zero adjustment of the load cell is gradually shortened or when a value of zero shift output greatly varies, the operator of the machine determines that the load cell is malfunctioning and can send the load cell to a maintenance section if necessary.

According to the present invention, zero adjustment of a load cell for detecting back pressure of a screw in an injection unit of an electric injection molding machine can be carried out correctly in a short time.

What is claimed is:

1. A method of zero adjustment of a load cell for detecting back pressure of a screw in an electric injection molding machine, the electric injection molding machine comprising:
   a heating barrel;
   a screw incorporated in the heating barrel and driven by a servomotor in an axial direction, which injects molten resin into a mold; and a load cell connected to a rear end portion of the screw, which detects back pressure of the screw, wherein the method comprises the steps of:

driving the servomotor for a preset period of time in a first direction in a half stroke position of the screw, then stopping the servomotor by automatic decompression, and detecting and recording an output of the load cell as a first output;

driving the servomotor for a preset period of time in a second direction opposite to the first direction, then stopping the servomotor by automatic decompression, and detecting and recording an output of the load cell as a second output; and calculating an average of the first output and the second output and performing zero adjustment of the load cell using the average while considering the average to be an output of the load cell under no-load conditions.

2. A method of zero adjustment according to claim 1, wherein the heating barrel is retreated and separated from the mold prior to the step of driving the servomotor for a preset period of time in the first direction.

3. A method of zero adjustment according to claim 1, further comprising when the average of the first output and the second output exceeds a given tolerance, it is determined that the load cell malfunctions, issuing an alarm by a control system.

4. A method of zero adjustment according to claim 1, further comprising storing date and time when the zero adjustment of the load cell is performed and the average of the first output and the second output in a storage unit as actual-result data, and displaying a given number of past actual-result data on a display panel of a control system.

* * * * *